United States Patent [19]
Van Kerckhove

[11] Patent Number: 5,812,599
[45] Date of Patent: Sep. 22, 1998

[54] METHOD FOR ALLOCATING DATA ELEMENTS IN MULTICARRIER APPLICATIONS AND EQUIPMENT TO PERFORM THIS METHOD

[75] Inventor: Jean Francois Van Kerckhove, Nethen, Belgium

[73] Assignee: Alcatel N.V., Rijswijk, Netherlands

[21] Appl. No.: 677,468

[22] Filed: Jul. 10, 1996

[30] Foreign Application Priority Data

Jul. 11, 1995 [EP] European Pat. Off. ............ 95201898

[51] Int. Cl.$^6$ ........................... H04K 1/10; H04L 27/28
[52] U.S. Cl. ..................... 375/260; 370/468; 375/240
[58] Field of Search ........................ 375/260, 240, 375/222; 370/468

[56] References Cited

U.S. PATENT DOCUMENTS

| | | | |
|---|---|---|---|
| 4,679,227 | 7/1987 | Hughes-Hartogs | 379/98 |
| 4,731,816 | 3/1988 | Hughes-Hartogs | 379/98 |
| 4,833,706 | 5/1989 | Hughes-Hartogs | 379/98 |
| 5,025,469 | 6/1991 | Bingham | 379/98 |
| 5,054,034 | 10/1991 | Hughes-Hartogs | 375/8 |
| 5,226,081 | 7/1993 | Hindkimoto | 380/34 |
| 5,285,474 | 2/1994 | Chow et al. | 375/13 |
| 5,317,596 | 5/1994 | Ho et al. | 375/14 |
| 5,400,322 | 3/1995 | Hunt et al. | 370/19 |
| 5,479,447 | 12/1995 | Chow et al. | 375/260 |
| 5,521,908 | 5/1996 | Younce et al. | 370/32.1 |

FOREIGN PATENT DOCUMENTS 8607223  12/1986  WIPO.

OTHER PUBLICATIONS

ANSI TIE1.4/94–007R6, p. 100.
"A Multicarrier El–HDSL Transceiver System with Coded Modulation", P. Chow et al, *Journal of European Transactions on Telecommunications and Related Technologies*, vol. 4, No. 3, May–Jun. 1993, pp. 257–266.
"Performance Evaluation of a Multichannel Transceiver System for ADSL and VHSDL Services", P. Chow et al, *IEEE Journal on Selected Areas in Communications*, vol. 9, No. 6, Aug. 1991, pp. 909–919.

*Primary Examiner*—Stephen Chin
*Assistant Examiner*—Mohammad Ghayour
*Attorney, Agent, or Firm*—Ware, Fressola, Van Der Sluys & Adolphson LLP

[57] ABSTRACT

To allocate a number of data elements which constitute a data symbol to a set of carriers used for transmission in multicarrier applications, a full capacity step and capacity fine tuning step are executed successively. In the full capacity step, the individual capacity or maximum amount of data elements that may be allocated to a carrier is determined for each carrier which forms part of the set of carriers. This maximum amount of data elements is then allocated to each carrier in such a way that a full capacity occupation of the carrier set is obtained. In case of undercapacity, i.e. in case more data elements have to be allocated to the set of carriers, the capacity of the carrier set is enlarged, for example by power boosting, and additional data elements are allocated to the carriers in accordance to a predetermined rule. In case of overcapacity on the other hand, data bits previously allocated to the set of carriers, are removed from some carriers selected in accordance with another predetermined rule.

9 Claims, 7 Drawing Sheets

| Carrier | SNRi | bi |
|---------|------|-----|
| f1 | 17 | 2 |
| f2 | 25 | 4 |
| f3 | 22 | 3 |
| f4 | 14 | 0 |
FIG. 6(a)
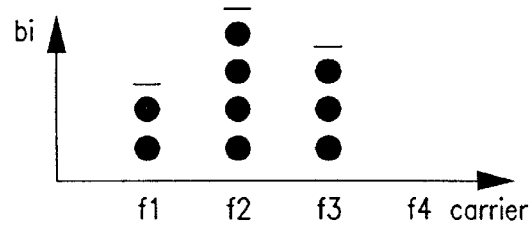
FIG. 6(e)
| Carrier | SNRi | bi | ANMi |
|---------|------|-----|------|
| f1 | 17 | 2 | 1 |
| f2 | 25 | 4 | 2 |
| f3 | 22 | 3 | 2 |
| f4 | 14 | 0 | 14 |
FIG. 6(b)
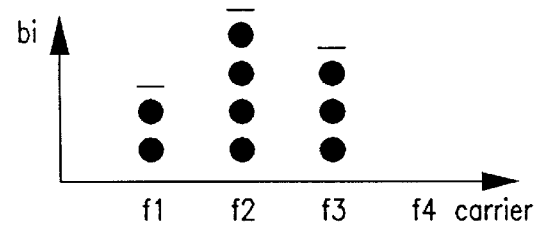
FIG. 6(f)
| Carrier | SNRi | bi | ANMi |
|---------|------|-----|------|
| f1 | 17 | 0 | 17 |
| f2 | 25 | 4 | 2 |
| f3 | 22 | 3 | 2 |
| f4 | 14 | 0 | 14 |
FIG. 6(c)
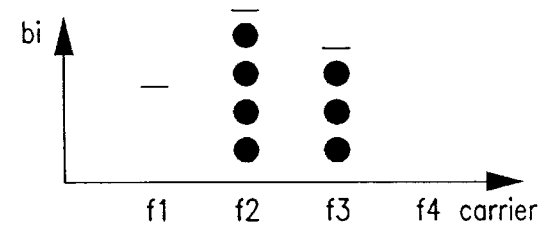
FIG. 6(g)
| Carrier | SNRi | bi | ANMi |
|---------|------|-----|------|
| f1 | 17 | 0 | 17 |
| f2 | 25 | 3 | 5 |
| f3 | 22 | 3 | 2 |
| f4 | 14 | 0 | 14 |
FIG. 6(d)
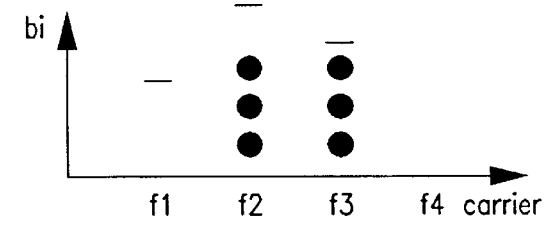
FIG. 6(h)

| Carrier | SNRi | bi |
|---------|------|-----|
| f1 | 17 | 2 |
| f2 | 25 | 4 |
| f3 | 22 | 3 |
| f4 | 14 | 0 |
FIG. 7(a)
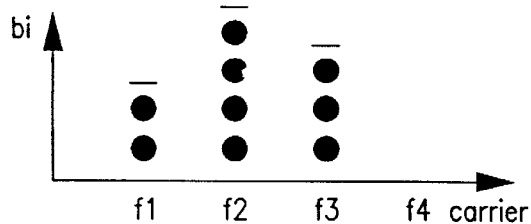
FIG. 7(g)
| Carrier | SNRi | bi | Bi |
|---------|------|-----|-----|
| f1 | 17 | 2 | 3 |
| f2 | 25 | 4 | ∞ |
| f3 | 22 | 3 | 1 |
| f4 | 14 | 0 | 2 |
FIG. 7(b)
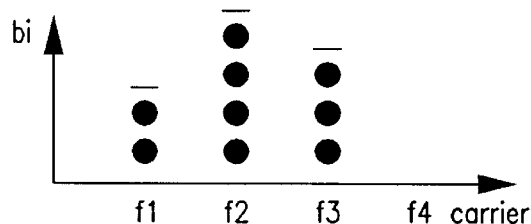
FIG. 7(h)
| Carrier | SNRi | bi | Bi |
|---------|------|-----|-----|
| f1 | 17 | 2 | 3 |
| f2 | 25 | 4 | ∞ |
| f3 | 22 | 4 | ∞ |
| f4 | 14 | 0 | 2 |
FIG. 7(c)
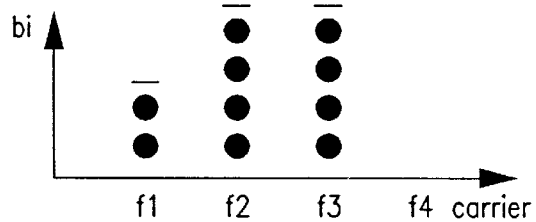
FIG. 7(i)
| Carrier | SNRi | bi | Bi |
|---------|------|-----|-----|
| f1 | 17 | 2 | 3 |
| f2 | 25 | 4 | ∞ |
| f3 | 22 | 4 | ∞ |
| f4 | 14 | 2 | 6 |
FIG. 7(d)
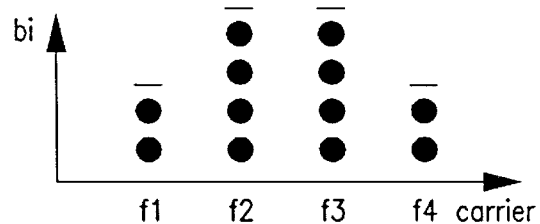
FIG. 7(j)

| Carrier | SNRi | bi | ANMi |
|---------|------|----|----|
| f1 | 17 | 2 | 3 |
| f2 | 25 | 4 | 4 |
| f3 | 22 | 4 | 1 |
| f4 | 14 | 2 | 0 |
FIG. 7(e)
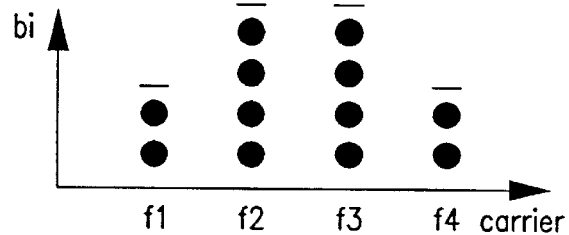
FIG. 7(k)
| Carrier | SNRi | bi | ANMi |
|---------|------|----|----|
| f1 | 17 | 2 | 3 |
| f2 | 25 | 4 | 4 |
| f3 | 22 | 3 | 4 |
| f4 | 14 | 2 | 0 |
FIG. 7(f)
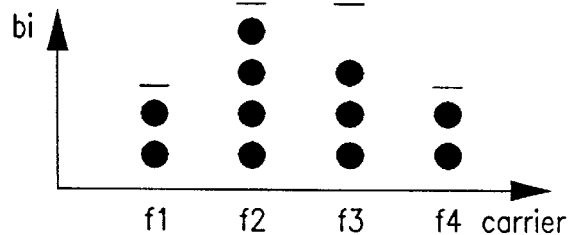
FIG. 7(l)
| bi | SNRreq |
|----|--------|
| 2 | 16 |
| 3 | 20 |
| 4 | 23 |
FIG. 8

METHOD FOR ALLOCATING DATA ELEMENTS IN MULTICARRIER APPLICATIONS AND EQUIPMENT TO PERFORM THIS METHOD

TECHNICAL FIELD

The present invention relates to a method for allocating data elements to a set of carriers, a program module for allocating data elements to a set of carriers, an allocation processing unit to perform this method, and a multicarrier modulator including such an allocation processing unit.

BACKGROUND OF THE INVENTION

Such a method and equipment to perform this method are already known in the art, e.g. from the U.S. Pat. No 4,679,227, entitled 'Ensemble modem structure for imperfect transmission media' from the inventor Dirk Hughes-Hartogs. Therein, a modem is described which transmits and receives digital data on a set of carriers called an ensemble of carrier frequencies. The modem includes a system for variably allocating data elements or data, and power to the carrier frequencies to be transmitted via a telephone line. In this modem, data elements are allocated to the ensemble of carrier frequencies in a straightforward way. Indeed, as is described on lines 6–11 of column 3 in the above cited U.S. Patent, a power allocation system included in the modem first computes the marginal required power to increase the symbol rate on each carrier from n to n+1 information units. In addition, the system allocates information units or data elements to the carrier that requires the least additional power to increase its symbol rate by one information unit. In other words, according to a predetermined rule—the carrier that requires the least additional power to increase the symbol rate for the modem described in U.S. Pat. No. 4,679,227—the data elements are thus allocated one by one until all data elements which constitute a data symbol are allocated. The predetermined rule is different in other known implementations of multicarrier modems, described in literature, but the basic concept of allocating data elements one by one to thereby build up the carrier occupations straightforwardly remains unchanged in all known solutions.

DISCLOSURE OF INVENTION

An object of the present invention is to provide a method, program module and equipment to perform this method of the above known type but wherein the carrier occupations are no longer built up straightforwardly, this method, program module and equipment thus providing an alternative solution for allocating data elements in multicarrier applications.

According to a first aspect of the present invention, a method for allocating a number of data elements, grouped in a packet of data elements called a data symbol and each of said data elements comprising at least one data bit, to a set of carriers to be modulated thereon and to be transmitted via a telecommunication line, is characterized in that said method includes a first, full capacity step, wherein for each carrier in said set of carriers an individual capacity number is determined, said individual capacity number being equal to a maximum amount of data elements that may be allocated to said carrier, and wherein to each said carrier said individual capacity number of data elements is allocated, and a second, capacity fine tuning step, wherein in case of undercapacity, that is, in case said number of data elements grouped in a said data symbol is larger than an overall capacity number, said overall capacity number being equal to a sum of individual capacity numbers of all said carriers, said overall capacity number is enlarged and additional data elements are allocated to said set of carriers in accordance with a predetermined capacity enlarging rule, and wherein in case of overcapacity, that is, in case said number of data elements grouped in a said data symbol is smaller than said overall capacity number, some of said data elements are removed from carriers in said set of carriers according to a predetermined data removing rule.

According to a second aspect of the present invention, a program module for an allocation processing unit for allocating a number of data elements, grouped in a packet of data elements called a data symbol and each of said data elements comprising at least one data bit, to a set of carriers to be modulated thereon and to be transmitted via a telecommunication line, said program module containing a set of control instructions, is characterized in that said set of control instructions is structured to control a sequence of operations in said allocation processing unit in such a way that in a first, full capacity phase, for each carrier in said set of carriers an individual capacity number is determined, said individual capacity number being equal to a maximum amount of data elements that may be allocated to said carrier, and to each said carrier said individual capacity number of data elements is allocated, and in a second, capacity fine tuning phase, in case of undercapacity, that is, in case said number of data elements grouped in a data symbol is larger than an overall capacity number, said overall capacity number being equal to a sum of individual capacity numbers of all said carriers, said overall capacity number is enlarged and additional data elements are allocated to said set of carriers in accordance to a predetermined capacity enlarging rule, and in case of overcapacity, that is, in case said number of data elements grouped in a said data symbol is smaller than said overall capacity number, some of said data elements are removed from carriers in said set of carriers according to a predetermined data removing rule.

According to a third aspect of the present invention, an allocation processing unit provided to calculate a distribution of a number of data bits which constitute a data symbol over a set of carriers, said allocation processing unit being provided with a first input whereto said number is applied and a second input whereto carrier property information is applied, is characterized in that said allocation processing unit includes a memory means a first part for storing said carrier property information, a second part for storing carrier requirement information, and a third part for storing data allocation information, that is, an amount of said data bits for assignment to each said carrier in said set, a first comparator means, coupled at its first input to an output of said first part of said memory means and at its second input to an output of said second part of said memory means, said first comparator means for comparing said carrier property information with said carrier requirement information, for thereby obtaining individual carrier capacities for said carriers, and for applying said individual carrier capacities via an output to a processing unit included in said allocation processing unit and coupled at an output to an input of said third part of said memory means said data allocation information wherein for each said carrier said amount of data bits allocated thereto equals said individual carrier capacity of said carrier, and that said allocation processing unit further includes a second comparator means, coupled at a first input to an output of said third part of said memory means and at its second input to said first allocation processing unit input said second comparator means for comparing said number of data bits which constitute a data symbol with an overall capacity number of said set of carriers, said overall capacity number being equal to a sum of said individual carrier capacities, and for thereby, in a capacity fine tuning step, activating said processing unit for assigning additional data elements to said carriers in accordance with a predetermined capacity enlarging rule in case of undercapacity and for removing data elements from said carriers in accordance with a predetermined data removing rule in case of overcapacity.

According to a fourth aspect of the present invention, a multicarrier modulator for modulation of data elements applied to an input thereof on a set of carriers for transmission thereof in a communication network coupled to an output thereof, said modulator including between said input and said output a cascade connection of a mapping unit, an inverse fast fourier transform processing unit, a cyclic prefix adder, a parallel to serial converter and a digital to analog converter, said mapping unit for allocating said data elements to said set of carriers and for thereby providing a frequency domain parallel sequence of data, said inverse fast fourier transform processing unit for inverse fast fourier transforming said frequency domain parallel sequence of data applied to its input and for thereby providing a time domain parallel sequence of data, said cyclic prefix adder for adding a cyclic prefix to said time domain parallel sequence of data to compensate for intersymbol interference due to transmission over transmission lines in said communication network, said parallel to serial converter for converting said time domain parallel sequence of data into a serial sequence of data for application to said digital to analog converter for transforming said serial sequence of data into an analog signal and for providing said analog signal to said output of said modulator, said mapping unit including an allocation processing unit for providing a distribution of a number of data bits which constitute a data symbol over a set of carriers, said allocation processing unit having a first input whereto said number is applied and a second input whereto carrier property information is applied, and a data allocation unit, an input of which is coupled to said modulator input and another input of which is coupled to an output of said allocation processing unit, said data allocation unit for allocating said data elements, based on said distribution provided by said allocation processing unit, to said set of carriers, is characterized in that said allocation processing unit includes a memory means having a first part for storing said carrier property information, a second part for storing carrier requirement information, and a third part for storing data allocation information, that is, an amount of said data bits for assignment to each said carrier in said set, a first comparator means, coupled at a first input to an output of said first part of said memory means and at a second input to an output of said second part of said memory means, said first comparator means for comparing said carrier property information with said carrier requirement information, for thereby obtaining individual carrier capacities for said carriers, and for providing said individual carrier capacities via an output to a processing unit included in said allocation processing unit and coupled at its output to an input of said third part of said memory means, said processing unit for providing to said third part of said memory means said data allocation information wherein for each said carrier said amount of data bits allocated thereto equals said individual carrier capacity of said carrier, and that said allocation processing unit further includes a second comparator means, coupled at a first input to an output of said third part of said memory means and at a second input to said first allocation processing unit input, said second comparator means for comparing said number of data bits which constitute a data symbol with an overall capacity number of said set of carriers, said overall capacity number being equal to a sum of said individual carrier capacities, and for thereby, in a capacity fine tuning step, activating said processing unit for assigning additional data elements to said carriers in accordance with a predetermined capacity enlarging rule in case of undercapacity and for removing data elements from said carriers in accordance with a predetermined data removing rule in case of overcapacity.

Indeed, in the full capacity step, data elements are allocated to the set of carriers without taking into account the number of data bits that actually has to be allocated. Whether the number of data bits that has to be allocated is small or large, the result of the full capacity step remains unaffected and depends only upon the individual capacities of the carriers in the set of carriers. Since for each carrier only its individual capacity for carrying data elements has to be measured and no further rules or measurements have to be taken into account, the full capacity step is executed quickly. The total processing time for allocating the data elements equals the sum of the time spent to the full capacity step and the time spent to the capacity fine tuning step which is executed successively. In the capacity fine tuning step the number of allocated data elements is adapted in such a way that the exact number of data bits is allocated to the set of carriers. When additional data elements have to be allocated, i.e. in case of undercapacity, the capacity of the carrier set is enlarged e.g. by power boosting in accordance to a capacity enlarging rule. Capacity is for example enlarged in such a way that minimal power boost is required to allow allocating the additional data elements. When too many data elements become allocated to the carrier set in the full capacity step on the other hand, i.e. in case of overcapacity, some of the allocated data elements are removed. This removal is also based on a predetermined rule, e.g. to maximize the minimum additional noise margin calculated for the carriers, this additional noise margin for one carrier being equal to SNRi-SNRreq, wherein SNRi represents the signal noise ratio measured on a carrier and wherein SNRreq represents the signal noise ratio required to allow allocating to this carrier an integer number of data elements.

Compared to the known straightforward allocation methods, the present method wherein data elements are allocated blindly in the first step till full capacity is reached and wherein the full capacity allocation is modified in a second step, is an alternative allocation method, whose processing time is smaller whenever the number of data elements to be allocated lays in the neighbourhood of the global capacity of the set of carriers.

As follows from claim 2, the individual capacity of a carrier for allocating data elements thereto, can be defined precisely. In a first implementation of the present method, the signal noise ratio measured on a carrier is compared with the required signal noise ratio values to allocate thereto integer numbers of data elements. In a second implementation, these required signal noise ratio values are enlarged by a fixed margin. Such a margin of 6 dB is for example prescribed in the draft *American National Standard for Telecommunications on ADSL* (Asymmetric Digital Subscriber Line), published by ANSI (American National Standards Institute) in April 1994, paragraph 12.8.3.3, page 100.

An additional characteristic feature of the present invention is that in a particular implementation thereof, the full capacity step is performed as described in claim 3. In this way, the individual capacity of each carrier is obtained by measuring the signal noise ratio on this carrier and defining the number of data elements which, when allocated to this carrier, requires a signal noise ratio lower than but as close as possible to the measured signal noise ratio.

Another characteristic feature of the present method is that, also in a particular implementation thereof, undercapacity fine tuning is performed as described in claim 4. In this way, the global capacity of the set of carriers is enlarged by applying the minimum power boost necessary to allow allocating all data elements to the carriers. In this particular implementation, the power distribution amongst the carriers is supposed to be flat. Therefore, this minimum power boost is applied to all carriers in the set. It is noted however that such a flat power distribution is not necessary when implementing the present method.

Still a further characteristic feature of the present allocation method is that, again in a particular implementation thereof, overcapacity fine tuning is performed as described in claim 5. In this way, the noise sensitivity of the carriers is minimized by removing data elements from the most noise sensitive carriers in the set. Indeed, a large additional noise margin, calculated as described above, is equivalent to a low noise sensitivity. Since data elements are removed from carriers with least additional noise margin, the minimum additional noise margins amongst the set of carriers is maximized. This renders the data transmission less sensitive for noise.

Yet another characteristic feature of the present method is that pseudo-overcapacity, caused by undercapacity fine tuning, is eliminated in a pseudo-overcapacity fine tuning step as described in claim 6. Such a pseudo-overcapacity is due to the fact that additional data elements are allocated to carriers in the undercapacity fine tuning step. These data elements may comprise different amounts of data bits dependent on the carrier whom they are allocated to. For ADSL (Asymmetric Digital Subscriber Line) applications for example, the already mentioned draft Standard excludes the existence of 1 bit constellations. A first data elements allocated to a carrier thus always contains 2 data bits whilst all further data elements allocated to this carrier comprise only 1 data bit. When the last additional data element allocated in the undercapacity fine tuning step contains 2 data bits, whilst only 1 additional data bit had to be allocated, the pseudo-overcapacity occurs. In this pseudo-overcapacity situation, a smaller data element comprising only 1 data bit can be removed from a carrier which is occupied by at least two data elements. To select amongst all carriers occupied by at least two data elements, the carrier where this data bit is removed from, a sequence of substeps similar to the substeps for overcapacity fine tuning described in claim 5 is executed. This implies that the small data element is removed from the carrier with least additional noise margin to thereby make this carrier less noise sensitive.

These and other objects, features and advantages of the present invention will become more apparent in light of the detailed description of a best mode embodiment thereof, as illustrated in the accompanying drawing.

BRIEF DESCRIPTION OF THE DRAWING

FIGS. 6(*a*)–6(*h*) includes a sequence of tables illustrating the contents of the memory means of the allocation processing unit shown in FIG. 2 during successive steps of the algorithm shown in FIG. 3, in case 6 data bits have to be distributed over a set of 4 carriers, and further includes a sequence of graphs illustrating the evolution of the data bit distribution over these carriers;

FIGS. 7(*a*)–7(*l*) includes a sequence of tables illustrating the contents of the memory means of the allocation processing unit shown in FIG. 2 during successive steps of the algorithm shown in FIG. 3, in case 11 data bits have to be distributed over a set of 4 carriers, and further includes a sequence of graphs illustrating the evolution of the data bit distribution over these carriers; and FIG. 8 is a representation of a 'required SNR per data element'-table used in the method illustrated by the flow chart of FIG. 3 to obtain the data bit allocation in the four examples accompanied by FIG. 4, FIG. 5, FIG. 6 and FIG. 7 respectively.

BEST MODE FOR CARRYING OUT THE INVENTION

Figure 1:
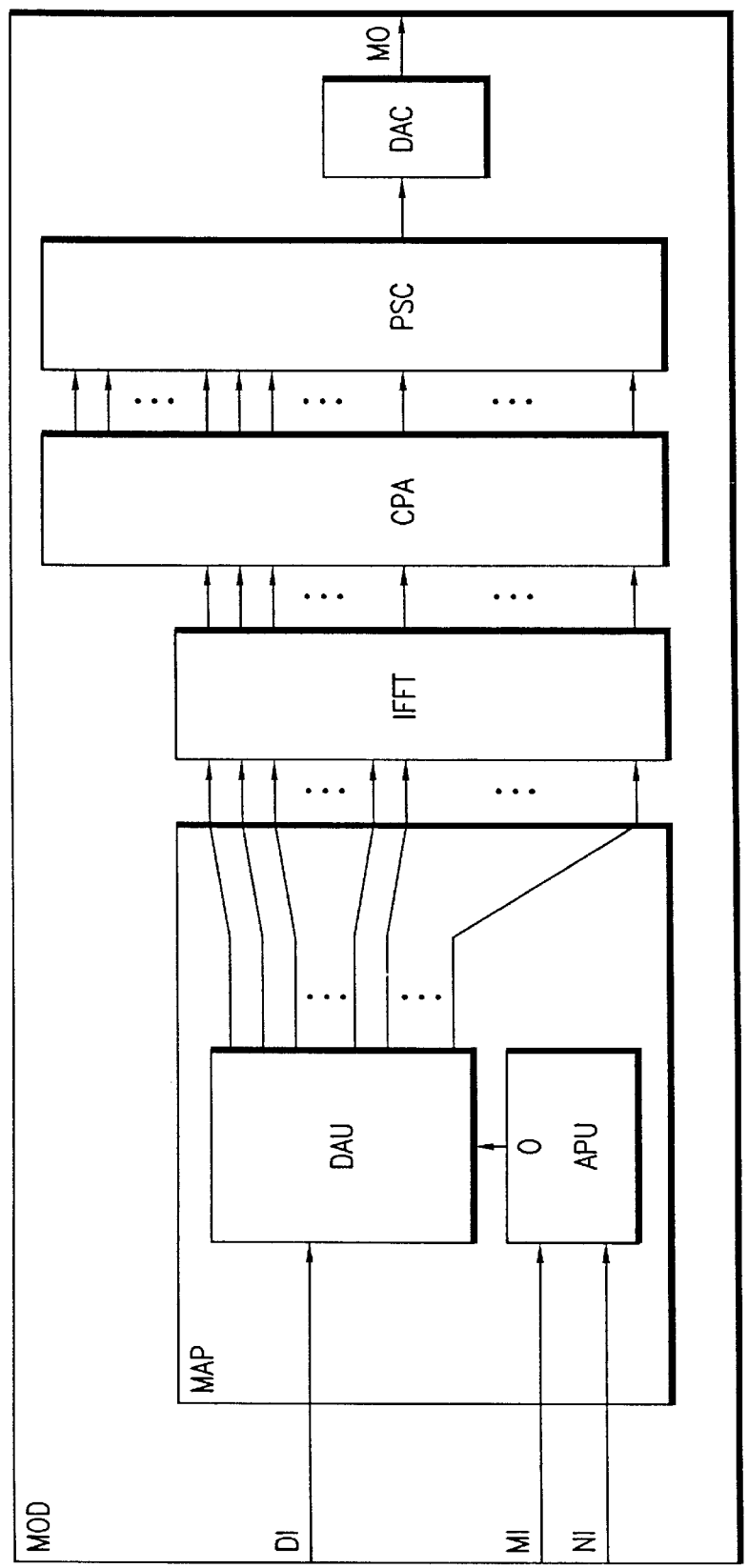
FIG. 1 is a block scheme of an embodiment of a Discrete Multi Tone (DMT) modulator according to the present invention.
Figure 2:
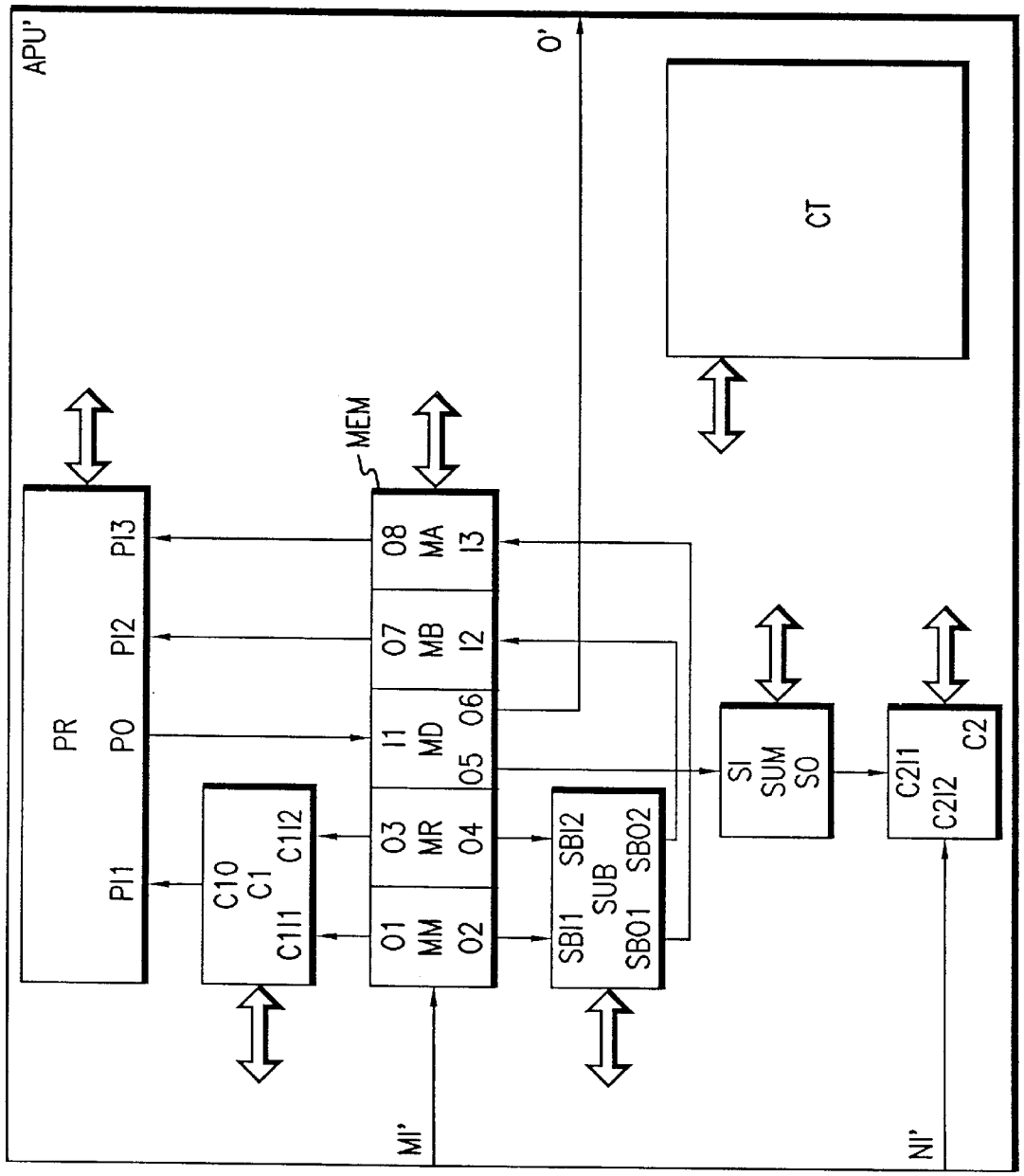
FIG. 2 is a block scheme of an embodiment of an allocation processing unit according to the present invention.

Referring to FIG. 1 and FIG. 2, the structure of a Discrete Multi Tone (DMT) modulator MOD, which is a preferred embodiment of the multicarrier modulator according to the present invention will be described in the first part of the description. The basic means included in a Discrete Multi Tone (DMT) modulator MOD as described in the draft ANSI Standard on ADSL are drawn in FIG. 1. These basic means and the functions provided thereby will be described in the first paragraphs of this first part. Since the present invention more specifically relates to the mapping unit and the allocation method executed thereby, some paragraphs in addition will be spent on describing a specific embodiment of an allocation processing unit included in such a mapping unit and equipped to perform the method according to the present invention. A detailed block diagram of this allocation processing unit is drawn in FIG. 2 while the allocation method executed thereby is illustrated by the flow chart of FIG. 3.

In the second part of the description, it will be explained how the means included in the allocation processing unit of FIG. 2 are controlled to perform the method illustrated in FIG. 3. The working of the allocation processing unit will be described by means of 4 examples, each passing through a different sequence of branches in the flow chart of FIG. 3. The contents of the memory means MEM in the allocation processing unit APU' of FIG. 3 as well as the distribution of data elements for the successive steps in these 4 examples are represented in the tables and graphs of FIG. 4, FIG. 5, FIG. 6 and FIG. 7 respectively. After having described the successive steps of these 4 examples, all branches of the flow chart of FIG. 3 will be passed through.

The Discrete Multi Tone (DMT) modulator MOD in FIG. 1 includes between an input DI, the data input, and output MO, the modulator output, the cascade connection of a mapping unit MAP, an inverse fast fourier transform processing unit IFFT, a cyclic prefix adder CPA, a parallel to serial converter PSC, and a digital to analog converter DAC. The mapping unit MAP in this cascade connection includes a data allocation unit DAU and an allocation processing unit APU. The allocation processing unit APU is provided with a first MI and second NI input and is further equipped with an output O connected to an input of the data allocation unit DAU. The modulator input DI is coupled to another input of the data allocation unit DAU.

According to the draft Standard on ADSL, the modulator MOD modulates data elements grouped in data symbols on a set of carriers having equidistant frequencies, and further applies the modulated carriers via the output MO to a twisted pair telephone line, not shown in FIG. 1. To be distributed over the set of carriers, the data elements entering the modulator MOD via DI, are first applied to the data allocation unit DAU which forms part of the mapper MAP. Based on a particular algorithm, the allocation processing unit APU in this mapper MAP calculates a data element distribution. It therefore is provided with carrier property information, the signal noise ratio measured on each carrier, this information being applied via the input MI, and with information indicating the total amount of data bits comprised by one data symbol, this information being applied via NI. The results of the calculations are supplied to the data allocation unit DAU via output 0 of the allocation processing unit APU. Upon receipt of these results, the data allocation unit DAU allocates data elements constituting one data symbol to the carriers and decides for each carrier of the set which modulation method has to be executed. The data allocation unit DAU e.g. allocates 2 bits to the first carrier, these 2 bits being modulated on this first carrier via 4 QAM modulation, allocates 4 bits to the second carrier, these 4 bits being modulated on this second carrier via 16 QAM modulation and so on. In a signal plane, each modulated carrier can be represented by a single point, representing the amplitude and phase of the carrier after modulation. Thus, a set of complex numbers represent the modulated carriers and are therefore outputted parallel at the data allocation unit output as a frequency domain parallel sequence of data. This frequency domain parallel sequence of data is converted into a time domain parallel sequence of data by the inverse fast fourier transform processing unit IFFT. If the transmission line would be perfect, i.e. if no intersymbol interference would be caused by the impulse response of the transmission line, the time domain parallel sequences of successive symbols could have been joined into a serial data stream, transformed into an analog signal and applied to the transmission line. Due to the effective impulse response length of the transmission line however, intersymbol interference occurs. Such intersymbol interference can be compensated by an adaptive filter at the receivers side. In known solutions and also suggested in paragraph 6.10 of the above cited draft Standard, such a digital filter technique at the receivers side is combined with cyclic prefix extension at the transmitters side to obtain sufficient intersymbol interference compensation. The time domain parallel sequence at the output of the inverse fast fourier transform processing unit IFFT is therefore applied to a cyclic prefix adder CPA which, in accordance with paragraph 6.10 on page 44 of the draft ADSL Standard, prepends the last real numbers of the time domain parallel sequence to this time domain parallel sequence to thereby generate an extended time domain parallel sequence of real numbers. The extended time domain parallel sequence is then applied to the cascade of parallel to serial converter PSC and digital to analog converter DAC to be successively transformed into a serial digital sequence and analog signal.

It is noted that an allocation processing unit of the above described type can also be provided in the demodulator at the receiver's side. The signal noise ratio on each carrier is then measured e.g. by transmitting in an initial phase, a predetermined signal from the transmitter to the receiver and by analyzing this signal in the receiver. The allocation processing unit thereupon calculates the data element distribution, and applies its results via a backward path in the transmission system to the data allocation unit DAU in the modulator at the transmitter's side. In such a system, no data processing unit has to be provided in the modulator at the transmitter's side.

The block scheme of the Discrete Multi Tone (DMT) modulator MOD in FIG. 1 will not be described in further detail since such a detailed description is of no importance for the present invention. Further details with respect to ADSL requirements are described in the already mentioned draft ANSI Standard on ADSL while specific implementations of Discrete Multi Tone modulators are found in the articles 'A multicarrier E1-HDSL Transceiver System with Coded Modulation', written by Peter S. Chow, Naofal Al-Dhahir, John M. Cioffi and John A. C. Bingham and published in the issue Nr. 3 May/June 1993 of the Journal of European Transactions on Telecommunications and Related Technologies (ETT), pages 257–266, and 'Performance Evaluation of a Multichannel Transceiver System for ADSL and VHDSL Services' from Peter S. Chow et al., published in the issue Nr. 6 August 1991 of the Journal of European Transactions on Telecommunications and Related Technologies (ETT), pages 909–919.

The present invention more specifically relates to the method performed by the allocation processing unit APU in FIG. 1. A particular embodiment of such an allocation processing unit APU' is drawn in FIG. 2.

The allocation processing unit APU' of FIG. 2 includes memory means MEM, a subtraction unit SUB, a summation unit SUM, a first comparator means C1, a second comparator means C2, a processor PR and a control unit CT. The memory means MEM is subdivided into a signal noise ratio measurement memory MM, a required signal noise ratio memory MR, a data allocation memory MD, a power boost memory MB and an additional noise margin memory MA.

A first input MI' of the allocation processing unit APU' is connected to an input of the signal noise ratio measurement memory MM. A first output O1 of this memory is connected to a first input C1I1 of the first comparator means C1, while a second output O2 thereof is connected to a first input SBI1 of the subtraction unit SUB. Similarly, an output O3 of the required signal noise ratio memory MR is connected to a second input C1I2 of the first comparator means C1, while another output O4 thereof is connected to a second input SBI2 of the subtraction unit SUB. An output, C1O of the first comparator means C1 is connected to a first input PI1 processor PR. The subtraction unit SUB on the other hand is provided with two outputs, the first SBO1 of which is connected to an input I3 of the additional noise margin memory MA and a second SBO2 of which is connected to an input I2 of the power boost memory MB. The data allocation memory MD is equipped with an input I1 and two outputs, O5 and O6. A connection is made between this input I1 and an output PO of the processor PR. One of the outputs, O5, is coupled to a first input C2I1 of the second comparator means C2 via the summation unit SUM, and the other output O6 is connected to an output O' of the allocation processing unit APU'. The summation unit SUM hereto is provided with an input SI and output SO. An output O7 of the power boost memory MB and an output of the additional noise margin memory MA are connected to respective second PI2 and third PI3 inputs of the processor PR. Finally, a second input NI' of the allocation processing unit APU' serves as a second input C2I2 of the second comparator means C2.

The processor PR, the first C1 and second C2 comparator means, the memory means MEM, the subtraction unit SUB and the summation unit SUM are all controlled by the controller unit CT. In FIG. 2, this is indicated by the double arrows which represent control lines between the control unit CT and the other means in the allocation processing unit APU'. The control lines themselves are not drawn in this figure since this would make the drawing unclear. However, from FIG. 2, it is obvious to a person skilled in the art how such control lines should be provided to obtain the working which will be described in the following paragraphs and which is illustrated by the algorithm flow chart of FIG. 3.

Figure 3:
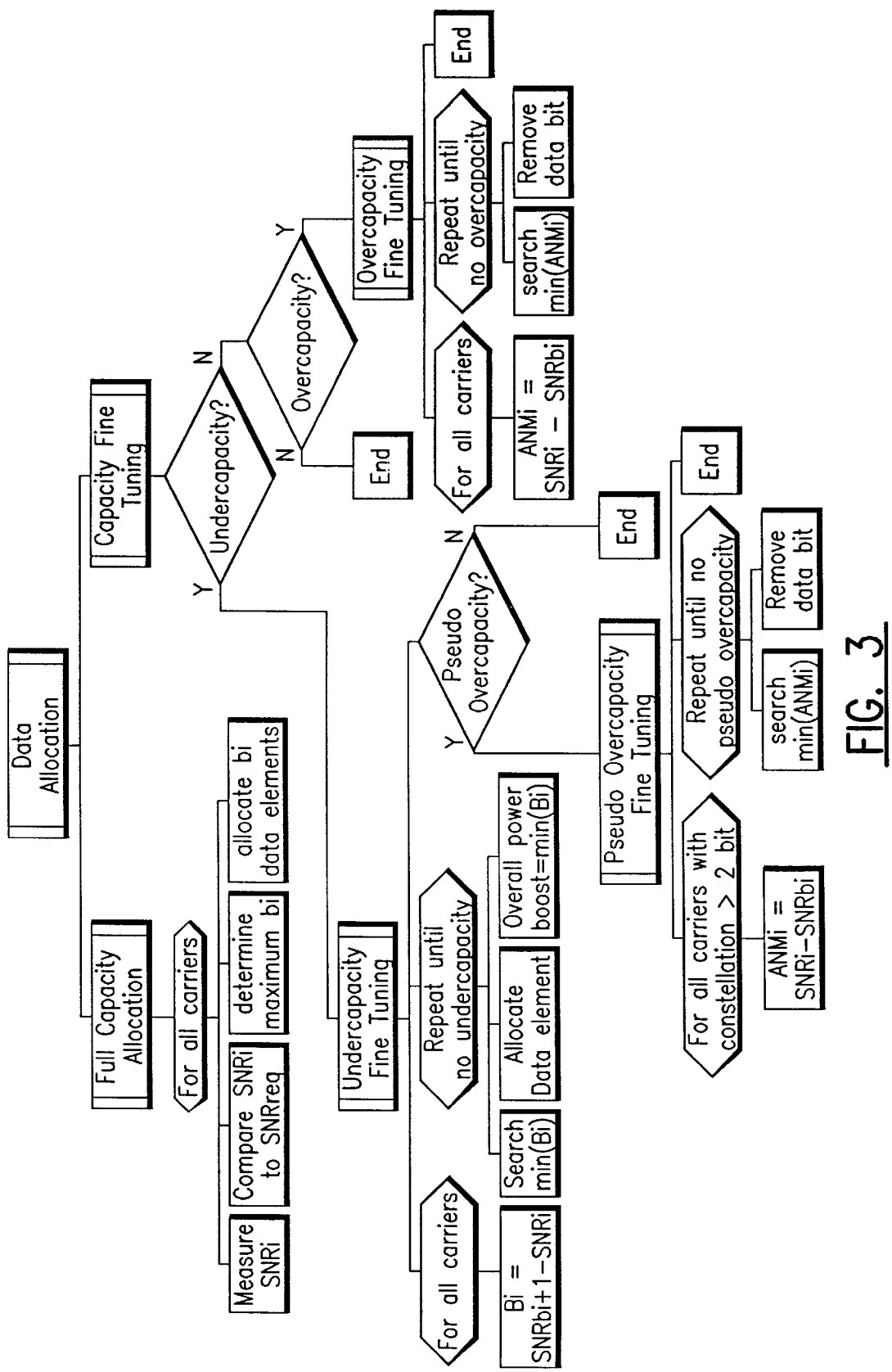
FIG. 3 is a flow chart diagram of a particular implementation of the method and program module according to the present invention, illustrating the steps and substeps therein.

The flow chart in FIG. 3 is build up with different shaped boxes interconnected via horizontal as well as vertical lines. Via the lines a unique tree of successive steps is obtained. The branches of this tree are stepped through from top to bottom and from left side to right side of the chart. The actions which have to be executed successively are represented by rectangle boxes. If the left and right side of such a rectangle box are drawn double, this box represents a procedure or cluster of actions. The actions included in this cluster are all connected to the bottom of the rectangle box with double left and right sides. Each hexagonal box indicates that an action or plurality of actions has to be executed repeatedly. The condition to determine how many times the actions have to be executed is described within the hexagonal box, while the actions that have to be executed are described in boxes connected to the bottom of the hexagonal box. A diamond shaped box on the other hand indicates that one of two actions has to be executed. If a predetermined condition is fulfilled, the action or branch of actions connected to the diamond side marked by Y is executed. If this predetermined condition is not fulfilled, the action or branch of actions connected to the N marked side of the diamond box is executed. The predetermined condition itself is described within the diamond shaped box.

The method whose steps and substeps are represented in the flow chart of FIG. 3 and which is performed by the allocation processing unit APU' of FIG. 2 is best explained by considering four fictitious situations wherein a specific number of data bits have to be distributed over a specific set of carriers. Therefore in the following part of the description, four examples will be described one after the other. In these examples, data bits have to be allocated to a set of four carriers, f1, f2, f3 and f4. The properties of these carriers are supposed to remain identical in the 4 described examples, which implies that the signal noise ratio values measured for each of the four carriers remain fixed. The minimum required signal noise ratio values allowed to be allocated to a carrier for 2, 3 or 4 data bits are equal to 16 dB, 20 dB and 23 dB respectively in the present example. The 'required SNR per data element'-table which includes these figures and which is stored in the required signal noise ratio memory MR of the allocation processing unit APU' in FIG. 2, is represented in FIG. 8. Since the set of carriers and the properties of the carriers in this set remain fixed for the four examples, only the number of data bits which has to be allocated is different. Dependent on this number, the steps of the algorithm which have to be executed will be different too.

Figures 4A, 4B:
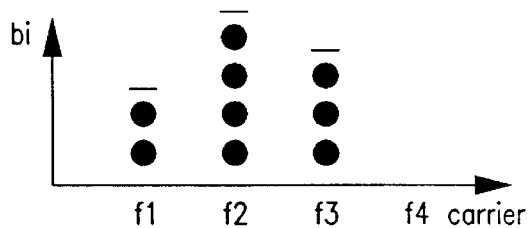
FIGS. 4(*a*)–4(*b*) includes a table illustrating the contents of the memory means of the allocation processing unit shown in FIG. 2 in case 9 data bits have to be distributed over a set of 4 carriers, and further includes a graph illustrating the distribution of data bits over these carriers.

In the first example, the allocation is performed by only executing the full capacity step of the present method since no overcapacity or undercapacity appears therein. The contents of the memory MEM of the allocation processing unit APU' of FIG. 2 for this example is shown in the table four. A graph illustrates this table in FIG. 4(b), showing the division of the data bits over the set of carriers. For the second example, FIGS. 5(a), 5(b) and 5(c) contains tables illustrating the contents of the memory MEM and corresponding graphs are drawn in FIGS. 5(d), 5(e) and 5(f). To obtain allocation according to the present invention, in the second example the full capacity step as well as the capacity fine tuning step for undercapacity are executed. In example 3, overcapacity occurs after full capacity allocation. Therefor the capacity fine tuning step dedicated to eliminate this overcapacity is executed in addition to the full capacity step. Tables are shown in FIGS. 6(a)–(d), and corresponding graphs in FIGS. 6(e)–(h); accompanying the explanation of example 3. Finally, the last example is illustrated the tables of FIGS. 7(a)–(f) and the corresponding graphs of FIGS 7(g)–(l). Full capacity allocation and undercapacity fine tuning in this fourth example cause pseudo-overcapacity. Elimination of this pseudo-overcapacity is done in an additional step, called the pseudo-overcapacity fine tuning step. All steps passed through by the four examples will be described in detail in the following paragraphs.

In example 1, 9 data bits have to be allocated to 4 carriers, f1, f2, f3 and f4. To allow allocating 2 bits to a carrier, a signal noise ratio of at least 16 dB has to be measured on this carrier. Similarly, 3 or 4 bits may be allocated to a carrier if at least 20 dB or 23 dB is measured for the signal noise ratio respectively. In an initial step, these signal noise ratio values SNRi are thus measured for each of the four carriers f1, f2, f3 and f4. The results of these measurements are applied to the allocation processing unit APU' of FIG. 2 via its measurement input MI' and additionally are stored in the signal noise ratio measurement memory MM. In the four examples that are described, the measured signal noise ratio values equal 17 dB, 25 dB, 22 dB and 14 dB for f1 f2, f3 and f4 respectively. These values are listed in column 2 of the table of FIG. 4(a) The first comparator C1 in FIG. 2 compares the minimum required signal noise ratio values stored in Sri to the measured values, and applies the results of this comparison to the processor PR. The measured 17 dB signal noise ratio value on carrier f1 for example is compared to the required signal noise ratio values, 16 dB, 20 dB and 23 dB. As a result, it is concluded that a maximum of 2 data bits may be allocated to f1. The processor PR then, via its output PO applies a signal to the data allocation memory MD to make it store the figure number two in its memory location reserved for f1. In a similar way, it is found that a maximum of 4, 3 and 0 data bits may be allocated to carriers f1, f3 and f4 respectively. These numbers are all stored in the data allocation memory MD of FIG. 2. The last column of the table in FIG. 4(a) gives an overview of the contents of these memory locations. Additionally, the control unit CT activates the summation unit SUM to calculate the sum of all numbers stored in MD. This sum equals the overall capacity number of the carrier set. In other words, it equals the number of data bits that has to be allocated to the set of carriers to fully occupy this set of carriers if no power boost is applied. The overall capacity in the first example is nine (2+4+3+0). Via the output SO of the summation unit SUM, this overall capacity number is applied to the first input C2I1 of the second comparator means C2I1 which compares this overall capacity number to the number of data bits which is comprised by a data symbol and which thus has to be allocated to the set of carriers. This number of data bits to be allocated enters the allocation processing unit APU' via the input NI' and is applied to the second comparator means C2 via its second input C2I2.

As already mentioned, in the first example nine data bits constituting one data symbol are to be allocated. The second comparator means C2 therefore informs the control unit CT that there is no positive or negative deficit in data elements after full capacity allocation. The control unit CT hereupon decides that the allocation processing can be terminated. The numbers stored in the data allocation memory MD are outputted via O' and applied to a data allocation unit DAU as shown in the mapper MAP of FIG. 1. The final data bit distribution for the first example is shown in the graph of FIG. 4(b). The horizontal stripes on each carrier in this graph represent the individual capacity of these carriers, while the black filled circles each represent a data bit. As is seen from the graph, each carrier is allocated its individual capacity number of data bits.

Figures 5A, 5D:
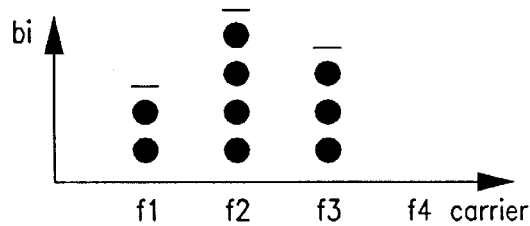
FIGS. 5(*a*)–5(*f*) includes a sequence of tables illustrating the contents of the memory means of the allocation processing unit shown in FIG. 2 during successive steps of the algorithm shown in FIG. 3, in case 10 data bits have to be distributed over a set of 4 carriers, and further includes a sequence of graphs illustrating the evolution of the data bit distribution over these carriers.
Figures 5B, 5E:
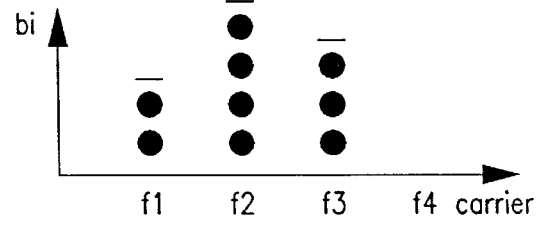

Consider now in a second example the situation wherein ten data bits have to be allocated to the same set of four carriers. The full capacity step in this second example is completely identical to the full capacity step of the first example and will therefore not be described here. The first table of FIG. 5(a) and corresponding graph in FIG. 5(d) give an overview of the memory contents and data bit distribution after the full capacity allocation step is performed and are nothing but a copy of the table and graph shown in FIGS. 4(a) and (b). It is clear that to be able to allocate a tenth data bit to the set of carriers f1, f2, f3 and f4, the overall capacity of this carrier set should be enlarged. The second comparator means C2 after having compared the overall capacity number to the number of data bits that has to be allocated, warns the control unit CT that there is a capacity deficit of one data bit. By this warning, the control unit CT is triggered to make the subtracting unit SUB calculate the power boost Bi necessary to enable allocating an additional data element to each carrier. It therefore subtracts the measured signal noise ratio SNRi from the required signal noise ratio value SNR-req allowing to allocation of at least one additional data element thereto. To allocate e.g. an additional data element of one data bit to the first carrier f1, a signal noise ratio of 20 dB is required since only 17 dB signal noise ratio was measured on this first carrier f1. The required power boost Bi for f1 equals thus 3 dB as shown in FIG. 5(b). The number three is therefore stored in the power boost memory location provided for f1. Since f2 already has four data bits allocated, its constellation can not be enlarged, which is indicated by the infinitely large required power boost ∞. For f3, a power boost Bi of 1 dB is sufficient to allow allocating thereto four data bits instead of three data bits. Finally, an additional data element of two data bits can be allocated to f4 if a power boost Bi of 2 dB is provided. The power boosts Bi for each of the carriers are thus calculated by the subtraction unit SUB, are stored in the power boost memory MB, and in addition are applied via the input PI2 to the processor PR. The processor PR then determines the minimum power boost that has to be provided to enable allocating an additional data element. From the table in FIG. 5(b), it follows that this minimal power boost is 1 dB and is found for f3. The processor therefore decides to allocate an additional data element which comprises 1 data bit to f3 and applies a signal to the data allocation memory MD to inform the memory about this decision. The contents of MD is adapted in such a way that it now includes the values listed in the table of FIG. 5(c). In FIG. 2, summation unit SUM calculates the overall capacity number after power boost by 1 dB. This sum equals ten data bits which in this second example is equal to the number of data bits that has to be allocated, this number being applied to the second comparator C2 via its second input C2I2. The second comparator means C2 tells the control unit CT that no further data bit deficit exists. Under the control of CT, the allocation is terminated by outputting the contents of MD via O'. It is also remarked that the data allocation unit of FIG. 1, to which the contents of MD is applied, further has to be informed about the 1 dB power boost that has to be performed.

Figures 5C, 5F:
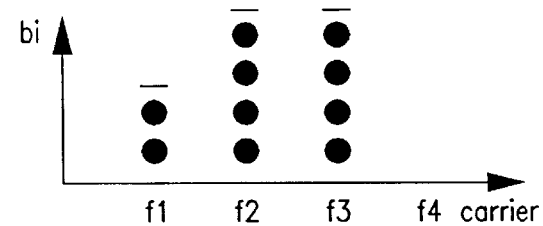

An overall power boost of 1 dB is then performed by this data allocation unit but it has to be noted that in an alternative implementation of the present method, this power boost may be applied only to f3 and not to f1, f2, and f4. The final distribution is shown in the graph of FIG. 5(f). Therein, it is seen that by applying an overall power boost of 1 dB, the individual capacity of f3, represented by the horizontal stripe, has increased while the individual capacities for carrying data elements of all other carriers in the set remain unchanged. The tenth data bit is allocated to f3 in such a way that the four carriers again become fully occupied after having performed the full capacity step and undercapacity fine tuning step of the present method.

In a third example, six data bits have to be allocated to the carriers f1, f2, f3 and f4. A full capacity step is again executed to determine for each carrier the maximum number of data bits that may be allocated thereto, and to allocate to each carrier its individual capacity number of data bits. This full capacity step and the distribution which is the result thereof are once more completely identical to the full capacity step performed in the first example. The table of FIG. 6(a) and the corresponding—therefor; graph in FIG. 6(e) remain unaffected when compared to the table and graph in FIGS. 4(a) and (b). For further explanations, reference is made to the above paragraphs.

The second comparator means C2 at the end of the full capacity step detects that nine data bits became allocated to the set of carriers in the full capacity step while only six data bits had to be allocated. A deficit of minus three data bits or overcapacity of three data bits is therefore announced to the control unit CT which triggers the subtraction unit SUB to perform the first substep of the overcapacity fine tuning step. For the four carriers, the subtraction unit SUB calculates the additional noise margin, which is a measure of the noise sensitivity for these carriers. The additional noise margin is calculated by subtracting from the signal noise ratio SNRi measured on a carrier, the required signal noise ratio SNRreq to allocate to this carrier its individual capacity number of data bits. If the additional noise margin of a carrier is small, the carrier is occupied almost completely and has no spare signal noise ratio margin anymore. In this situation, the respective carrier will be very noise sensitive. The signal noise ratio measured for f1 equals 17 dB, while full capacity occupation of the first carrier f1, i.e. allocation of two data bits thereto, requires 16 dB signal noise ratio. The remaining margin or additional noise margin of f1 is thus equal to 1 dB. From the table in FIG. 6(b), it is seen that the additional noise margins ANMi calculated in an analog way for f2, f3, f4 equal 2 dB, 2 dB and 14 dB respectively. Having the above conclusion that small additional noise margins are equivalent for high noise sensitivities in mind, it is obvious that the additional noise margin ANMi should be as large as possible. If a data element, previously allocated to a carrier, is removed therefrom, the additional noise margin ANMi of this carrier will be enlarged. Thus, in the overcapacity fine tuning step implemented in the described embodiment, data elements are removed from carriers which have the smallest additional noise margins. As already said, the subtraction unit SUB calculates the additional noise margins and in addition applies these additional noise margins to the additional noise margin memory MA to be stored therein. The values stored in MA are then applied to the processor PR which, still under the control of the control unit CT, determines the minimum additional noise margin and which orders the data allocation memory MD to remove a data element from the carrier having this smallest additional noise margin. From the table in FIG. 6(b), it follows that f1 has the smallest additional noise margin. Therefore, a data element comprising two data bits is removed from f1 to obtain the distribution drawn the graph of FIG. 6(c). Since seven data bits are still therefore; allocated to the set of carriers while only six data bits should be allocated, the just described procedure of calculating additional noise margins, storing these additional noise margins in the additional noise margin memory MA, determining the minimum additional noise margin and removing a data element from the carrier having this minimal additional noise margin is repeated. The new list of additional noise margins ANMi is shown in the last column of the table of FIG. 6(c). Carrier f2 and carrier f3 are most noise sensitive and thus are two candidates for data element removal. To f2 however, four data bits already became allocated while f3 is occupied by three data bits and will therefore be a bit less noise sensitive than f2. The processor PR decides to remove a data element comprising 1 data bit from the second carrier f2. The final constellation and memory contents are illustrated by the graph of 6(h) and table of FIG. 6(d). As a result of the data element removal, the carriers f1 and f2 are no longer fully occupied. An overall power reduction cannot be performed since f3 is still completely occupied but in an alternative implementation of the present method, it would be possible to reduce power on f1 and f2 without affecting the power allocated to f3 and f4. In the present implementation, an increase of additional noise margin is gained instead of a decrease in power. Reference is made to the last column of the tables in FIGS. 6(b)–(d) to notice this gain in additional noise margin ANMi.

In the last example, eleven data bits have to be allocated to the carriers f1, f2, f3 and f4. During the full capacity step, nine data bits are allocated to the carriers and are distributed over these carriers as indicated in the table of FIG. 7(a). Under the control of the control unit CT in FIG. 2, undercapacity fine tuning is provided in the capacity fine tuning step in a way similar to the undercapacity fine tuning performed in example 2 and described in the above paragraphs related thereto. Since the required power boost Bi for allocating an additional data element is minimal for f3, a first additional data element comprising 1 data bit is allocated to f3. As a result, the constellation obtained is equal to the final constellation of example 2. Thus, the three tables of FIGS. 7(a)–(c) and corresponding graphs in FIGS. 7(g)–(i) are identical to the tables and graphs in FIGS. 5.

The second comparator C2 now detects that there is still a deficit of 1 data bit: ten data bits are allocated, eleven data bits have to be allocated. The control unit CT is informed about this deficit and controls the subtraction unit SUB to recalculate the power boosts Bi necessary to add a second additional data element to the carriers f1, f2, f3 and f4. The new power boost values are listed in the last column of the table in FIG. 7(c). From this list it is seen that a power boost of 2 dB is required to allow allocating a first data element to f4. The processor PR concludes that this is the smallest required power boost and therefore orders MD to allocate an additional data element comprising two data bits to f4. The so obtained distribution is drawn in the graph of FIG. 7(j), while the last column of the corresponding table of FIG. 7(d) already contains the required power boost values for allocating a further additional data element to the set of carriers. Since no further additional data element has to be allocated, the information in this column and the calculation thereof is superfluous and will not be provided by an intelligent implementation of the present invention.

Instead of undercapacity, the second comparator C2 detects an overcapacity of one data bit. This overcapacity is caused by immediately allocating a data element which comprises two data bits to f4. In ADSL (Asymmetric Digital Subscriber Line) applications however, as prescribed in the draft Standard, no one bit constellations are allowed. Since allocating two data bits to f4 with respect to minimal power boost is a better solution than allocating only one data bit to another carrier it is obvious to do so in the undercapacity fine tuning. Because a power boost is requested, the so caused overcapacity thus is a pseudo-overcapacity which results from undercapacity fine tuning and standardization requirements taken into account to build up the preferred embodiment. Upon detecting this pseudo-overcapacity, the control unit CT triggers the means in the allocation processing unit APU' to start up a pseudo-overcapacity fine tuning step wherein this pseudo-overcapacity is eliminated. To eliminate the pseudo-overcapacity in the concrete situation of the fourth example, one data bit has to be removed. Since this bit may not be removed from carriers with two bit constellations, only carriers with constellations larger than two data bits have to be taken into account. For these carriers, the already described overcapacity fine tuning provides a good solution for eliminating the pseudo-overcapacity. Therefor, subtraction unit SUB in FIG. 2 calculates the additional noise margins for the carriers f2 and f3 and applies these additional noise margins to the additional noise margin memory MA to be temporarily stored therein. The additional noise margin for f2 equals 4 dB, the additional noise margin for f3 equals 1 dB. The processor PR searches the minimal additional noise margin among f2 and f3 and orders MD to reduce the number of data bits allocated to f3 by 1. The additional noise margins ANMi stored in MA are listed in the last column of the table in FIG. 7(e). The final obtained distribution is drawn in the graph of FIG. 7(l). It is seen from this graph that f3 is no longer completely occupied. By removing one data bit from f3, is additional noise margin ANMi is enlarged from 1 dB to 4 dB. This is indicated in the table of FIG. 7(f). Calculating the additional noise margins ANMi listed in this table however is useless and will therefore not be done in an intelligent implementation of the present invention. Eleven data elements are now allocated to the set of four carriers. The contents of the data allocation memory MD is outputted via output O' in FIG. 2. It is noted that a data allocation unit similar to the one drawn in the mapper MAP in FIG. 1 has to be provided with the above outputted data allocation information and with additional information indicating that a power boost of 2 dB is necessary to allow allocating the data elements as shown in the graph of FIG. 7(l).

It is noticed that although this is not stated explicitly in the above description, the number of data elements that constitute a data symbol can be different for successive data symbols that have to be transmitted. Since the allocation processing unit APU' shown in FIG. 2 is provided with an input NI' to which the number is applied which is equal to the number of data bits in a data symbol, the described method and equipment also apply to systems wherein successive data symbols have different lengths. Such a system and a method to modify the length of successive data symbols e.g. is described in the U.S. Pat. No. 5,400,322 entitled 'Updating of bit allocations in a multicarrier modulation transmission system' from the assignee Amati Communications Corp.

Furthermore it is noticed that the present method is also applicable to multicarrier applications wherein data elements according to specific criteria are partitioned into subgroups and wherein the carriers similarly are partitioned into subsets, each subset of carriers being associated to a subgroup of data elements. In such systems, data elements may be allocated only to carriers which form part of the subset associated to the subgroup of data elements where they belong to. To distribute the data elements of a subgroup over the carriers of the associated subset, the present invention also provides an alternative way for the known solutions.

It is further remarked that the present invention is not restricted to the rules and criteria used in the described embodiment to determine the individual capacity of the carriers, to decide which carrier is assigned additional data elements in case of undercapacity, and to decide from which carrier data elements are removed in case of overcapacity or pseudo-overcapacity.

It should also be remarked that, although the use of QAM (Quadrature Amplitude Modulation) is mentioned in the above description of the preferred embodiment, it will be evident to a person skilled in the art that the present allocation method is not restricted to systems wherein QAM modulation is applied, but can be implemented also e.g. in systems with PSK (Phase Shift Keying) modulation or LAM (Linear Amplitude Modulation). As already mentioned before, different ones of these modulation techniques may be applied to different carriers in the set of carriers where data elements are allocated to, and as a result thereof different carriers may be accompanied by different 'required SNR per data element' tables.

Yet it is noticed that although the described embodiment of the modulator is used in ADSL applications, the present method can be implemented in other transmission systems too, e.g. Orthogonal Frequency Division Multiplexing (OFDM) for coax cable applications.

While the principles of the invention have been described above in connection with specific apparatus, it is to be clearly understood that this description is made only by way of example and not as a limitation on the scope of the invention.

I claim:

1. A method for allocating a number of data elements, grouped in a packet of data elements called a data symbol and each of said data elements comprising at least one data bit, to a set of carriers to be modulated thereon and to be transmitted via a telecommunication line, characterized in that said method includes a first, full capacity step, wherein for each carrier in said set of carriers an individual capacity number is determined, said individual capacity number being equal to a maximum amount of data elements that may be allocated to said carrier, and wherein to each said carrier said individual capacity number of data elements is allocated, and a second, capacity fine tuning step, wherein in case of undercapacity, that is, in case said number of data elements grouped in a said data symbol is larger than an overall capacity number, said overall capacity number being equal to a sum of individual capacity numbers of all said carriers, said overall capacity number is enlarged and additional data elements are allocated to said set of carriers in accordance with a predetermined capacity enlarging rule, and wherein in case of overcapacity, that is, in case said number of data elements grouped in a said data symbol is smaller than said overall capacity number, some of said data elements are removed from carriers in said set of carriers according to a predetermined data removing rule.

2. A method according to claim 1, characterized in that in said first, full capacity step, a said individual capacity number for a said carrier is obtained by comparing a signal noise ratio value measured on said carrier with required signal noise ratio values for allocating integer numbers of said data elements to said carrier, said required signal noise ratio values being listed in a required SNR per data element table.

3. A method according to claim 1, characterized in that said first, full capacity step comprises for each said carrier a first substep wherein a signal noise ratio value (SNRi) is measured on said carrier, a second substep wherein a measured signal noise ratio value (SNRi) is compared with required signal noise ratio values (SNRreq) for allocating integer numbers of said data elements to said carriers, a third substep wherein said individual capacity number is determined as being an integer number having an associated required signal noise ratio value (SNRreq) lower than said measured signal noise ratio value (SNRi) but larger than or equal to said required signal noise ratio values (SNRreq) which are lower than said measured signal noise ratio value (SNRi), and a fourth substep wherein said individual capacity number of said data elements is allocated to said carrier.

4. A method according to claim 1, characterized in that said second, capacity fine tuning step in case of undercapacity comprises a first substep wherein for each said carrier a required power boost (Bi) is calculated, said required power boost (Bi) being equal to SNRreq'-SNRi, wherein SNRreq' represents a required signal noise ratio value which allows an allocation of an additional data element to said carrier and wherein SNRi represents a signal noise ratio value measured on said carrier, a second substep wherein in said set of carriers, a carrier having a minimal required power boost (Bi) is determined, a third substep wherein a said additional data element is allocated to said carrier with said minimal required power boost (Bi), and a fourth substep wherein an overall power boost equal to said minimal required power boost (Bi) is applied to each said carrier which forms part of said set of carriers, said first, second, third and fourth substeps being repeated until said undercapacity is eliminated.

5. A method according to claim 1, characterized in that said second, capacity fine tuning step in case of overcapacity comprises a first substep wherein for each said carrier an additional noise margin (ANMi) is calculated, said additional noise margin (ANMi) being equal to SNRi-SNRreq, wherein SNRi represents a signal noise ratio value measured on said carrier, and wherein SNRreq represents a required signal noise ratio value to allow allocating to said carrier an individual capacity number of data elements, a second substep wherein in said set of carriers, a carrier having an additional noise margin (ANMi) that is minimal is determined, and a third substep wherein a data element allocated previously to said carrier with minimal additional noise margin (ANMi) is removed therefrom, said first, second and third substep being repeated until said overcapacity is eliminated.

6. A method according to claim 4, characterized in that said method further includes a pseudo-overcapacity fine tuning step executed in case a last said additional data element allocated to a said carrier in said second, capacity fine tuning step in case of undercapacity comprises more said data bits than necessary to eliminate said undercapacity, said pseudo-overcapacity step comprising a first substep wherein for each said carrier occupied by data elements which comprise less data bits than a last allocated data element an additional noise margin (ANMi) is calculated, said additional noise margin being equal to SNRi-SNRreq, wherein SNRi represents a signal noise ratio value measured on said carrier, and wherein SNRreq represents a required signal noise ratio value to allow allocating thereto the number of data elements previously allocated thereto in said full capacity step and said capacity fine tuning step, a second substep wherein among said carriers occupied by data elements which comprise less data bits than said last allocated data element, a carrier with an additional noise margin (ANMi) that is minimal is determined, and a third substep wherein a data element which comprises less data bits is removed from said carrier with minimal said additional noise margin (ANMi).

7. A program module embodied in a computer-readable medium for controlling a sequence of operations in an allocation processing unit (APU') for allocating a number of data elements, grouped in a packet of data elements called a data symbol and each of said data elements comprising at least one data bit, to a set of carriers to be modulated thereon and to be transmitted via a telecommunication line, said program module containing a set of control instructions, characterized in that said set of control instructions is structured to control said sequence of operations in said allocation processing unit (APU') in such a way that in a first, full capacity phase, for each carrier in said set of carriers an individual capacity number is determined, said individual capacity number being equal to a maximum amount of data elements allocable to said carrier, and to each said carrier said individual capacity number of data elements is allocated, and in a second, capacity fine tuning phase, in case of undercapacity, that is, in case said number of data elements grouped in a data symbol is larger than an overall capacity number, said overall capacity number being equal to a sum of individual capacity numbers of all said carriers, said overall capacity number is enlarged and additional data elements are allocated to said set of carriers in accordance to a predetermined capacity enlarging rule, and in case of overcapacity, that is, in case said number of data elements grouped in a said data symbol is smaller than said overall capacity number, some of said data elements are removed from carriers in said set of carriers according to a predetermined data removing rule.

8. An allocation processing unit (APU') provided to calculate a distribution of a number of data bits which constitute a data symbol over a set of carriers, said allocation processing unit (APU') being provided with a first input (NI') whereto said number is applied and a second input (MI') whereto carrier property information is applied, characterized in that said allocation processing unit (APU') includes a memory means (MEM) a first part (MM) for storing said carrier property information, a second part (MR) for storing carrier requirement information, and a third part (MD) for storing data allocation information, that is, an amount of said data bits for assignment to each said carrier in said set, a first comparator means (C1), coupled at its first input (C1I1) to an output (O1) of said first part (MM) of said memory means (MEM) and at its second input (C1I2) to an output (O2) of said second part (MR) of said memory means (MEM), said first comparator means (C1) for comparing said carrier property information with said carrier requirement information, for thereby obtaining individual carrier capacities for said carriers, and for applying said individual carrier capacities via an output (C1O) to a processing unit (PR) included in said allocation processing unit (APU') and coupled at an output (PO) to an input (I1) of said third part (MD) of said memory means (MEM), said processing unit (PR) for applying to said third part (MD) of said memory means (MEM) said data allocation information wherein for each said carrier said amount of data bits allocated thereto equals said individual carrier capacity of said carrier, and that said allocation processing unit (APU') further includes a second comparator means (C2), coupled at a first input (C2I1) to an output (O5) of said third part (MD) of said memory means (MEM) and at its second input (C2I2) to said first allocation processing unit input (NI'), said second comparator means (C2) for comparing said number of data bits which constitute a data symbol with an overall capacity number of said set of carriers, said overall capacity number being equal to a sum of said individual carrier capacities, and for thereby, in a capacity fine tuning step, activating said processing unit (PR) for assigning additional data elements to said carriers in accordance with a predetermined capacity enlarging rule in case of undercapacity and for removing data elements from said carriers in accordance with a predetermined data removing rule in case of overcapacity.

9. A multicarrier modulator (MOD) for modulation of data elements applied to an input (DI) thereof on a set of carriers for transmission thereof in a communication network coupled to an output (MO) thereof, said modulator (MOD) including between said input (DI) and said output (MO) a cascade connection of a mapping unit (MAP), an inverse fast fourier transform processing unit (IFFT), a cyclic prefix adder (CPA), a parallel to serial converter (PSC) and a digital to analog converter (DAC), said mapping unit (MAP) for allocating said data elements to said set of carriers and for thereby providing a frequency domain parallel sequence of data, said inverse fast fourier transform processing unit (IFFT) for inverse fast fourier transforming said frequency domain parallel sequence of data applied to its input and for thereby providing a time domain parallel sequence of data, said cyclic prefix adder (CPA) for adding a cyclic prefix to said time domain parallel sequence of data to compensate for intersymbol interference due to transmission over transmission lines in said communication network, said parallel to serial converter (PSC) for converting said time domain parallel sequence of data into a serial sequence of data for application to said digital to analog converter for transforming said serial sequence of data into an analog signal and for providing said analog signal to said output (MO) of said modulator (MOD), said mapping unit (MAP) including an allocation processing unit (APU) for providing a distribution of a number of data bits which constitute a data symbol over a set of carriers, said allocation processing unit (APU) having a first input (NI) whereto said number is applied and a second input (MI) whereto carrier property information is applied, and a data allocation unit (DAU), an input of which is coupled to said modulator input (DI) and another input of which is coupled to an output (O) of said allocation processing unit (APU), said data allocation unit (DAU) for allocating said data elements, based on said distribution provided by said allocation processing unit (APU), to said set of carriers, characterized in that said allocation processing unit (APU) includes a memory means having a first part for storing said carrier property information, a second part for storing carrier requirement information, and a third part for storing data allocation information, that is, an amount of said data bits for assignment to each said carrier in said set, a first comparator means, coupled at a first input to an output of said first part of said memory means and at a second input to an output of said second part of said memory means, said first comparator means for comparing said carrier property information with said carrier requirement information, for thereby obtaining individual carrier capacities for said carriers, and for providing said individual carrier capacities via an output to a processing unit included in said allocation processing unit (APU) and coupled at its output to an input of said third part of said memory means, said processing unit for providing to said third part of said memory means said data allocation information wherein for each said carrier said amount of data bits allocated thereto equals said individual carrier capacity of said carrier, and that said allocation processing unit (APU) further includes a second comparator means, coupled at a first input to an output of said third part of said memory means and at a second input to said first allocation processing unit input (NI), said second comparator means for comparing said number of data bits which constitute a data symbol with an overall capacity number of said set of carriers, said overall capacity number being equal to a sum of said individual carrier capacities, and for thereby, in a capacity fine tuning step, activating said processing unit for assigning additional data elements to said carriers in accordance with a predetermined capacity enlarging rule in case of undercapacity and for removing data elements from said carriers in accordance with a predetermined data removing rule in case of overcapacity.

\* \* \* \* \*